(12) United States Patent  
Ford et al.

(10) Patent No.: US 9,400,032 B2
(45) Date of Patent: *Jul. 26, 2016

(54) VEHICLE WHEEL BALANCE WEIGHTS

(71) Applicant: Hennessy Industries, Inc., LaVergne, TN (US)

(72) Inventors: Todd J. Ford, Bowling Green, KY (US); Andrew Freeman, Bowling Green, KY (US)

(73) Assignee: Hennessy Industries, Inc., La Vergne, TN (US)

( * ) Notice: Subject to any disclaimer, the term of this patent is extended or adjusted under 35 U.S.C. 154(b) by 522 days.

This patent is subject to a terminal disclaimer.

(21) Appl. No.: 13/688,756

(22) Filed: Nov. 29, 2012

(65) Prior Publication Data

US 2013/0134766 A1    May 30, 2013

Related U.S. Application Data

(60) Provisional application No. 61/564,640, filed on Nov. 29, 2011.

(51) Int. Cl.
*F16F 15/34* (2006.01)
*B23P 11/00* (2006.01)

(52) U.S. Cl.
CPC ............... *F16F 15/345* (2013.01); *B23P 11/00* (2013.01); *Y10T 29/49826* (2015.01); *Y10T 29/49881* (2015.01); *Y10T 29/49945* (2015.01)

(58) Field of Classification Search
CPC .......... F16F 15/32; F16F 15/34; F16F 15/324
USPC ............... 301/5.21, 5.22, 154.1, 53.5, 37.108
See application file for complete search history.

(56) References Cited

U.S. PATENT DOCUMENTS 1,889,577 A    11/1932    Tibbetts
1,973,173 A *  9/1934    Le Jeune ............... 301/5.21
(Continued)

FOREIGN PATENT DOCUMENTS

DE    3118222 A1    11/1982
DE    3529513 A1    2/1987
(Continued)

OTHER PUBLICATIONS

Partial machine translation of JP3053876U, 2 pages.
(Continued)

*Primary Examiner* — S. Joseph Morano
*Assistant Examiner* — Jean Charleston
(74) *Attorney, Agent, or Firm* — Nelson Mullins Riley & Scarborough, LLP (57) ABSTRACT

A vehicle wheel weight for attachment to a wheel rim comprises a mass portion formed of nonlead material and configured to be juxtaposed against a wheel rim when attached to a wheel. The mass portion defines a clip groove on an exterior side thereof, with the clip groove being defined by opposed first and second sidewalls. The wheel weight also includes a clip having an extended portion for engaging the wheel rim and an attachment portion seated in the clip groove. A self-locking arrangement is provided on the clip and the mass portion for interconnecting the attachment portion of the clip with the mass portion such that when the attachment portion is seated in the clip groove the self-locking arrangement secures the clip to the mass portion.

25 Claims, 8 Drawing Sheets

(56) References Cited

U.S. PATENT DOCUMENTS

| | | | |
|---|---|---|---|
| 2,122,065 A | 6/1935 | Hume | |
| 2,026,454 A * | 12/1935 | Benzing | 411/517 |
| 2,029,132 A | 1/1936 | Skelton | |
| 2,049,703 A | 8/1936 | Hume | |
| 2,137,415 A | 11/1938 | Rubsam | |
| 2,221,747 A | 11/1940 | Turner | |
| 2,336,920 A | 12/1943 | Beaman | |
| 2,640,727 A | 6/1953 | Kennedy | |
| 2,696,408 A | 12/1954 | Merriman | |
| 3,008,768 A | 11/1961 | Kinsey et al. | |
| 3,011,828 A | 12/1961 | Karing | |
| 3,221,790 A * | 12/1965 | Poupitch | 411/301 |
| 3,495,877 A | 2/1970 | Morne | |
| 3,633,263 A * | 1/1972 | Hoeksema | 29/412 |
| 3,669,500 A * | 6/1972 | Ende | 301/5.21 |
| 3,688,380 A * | 9/1972 | Dionys Hofmann et al. | 29/243.56 |
| 3,786,850 A | 1/1974 | Turoczi, Jr. | |
| 4,027,549 A * | 6/1977 | Colletti | 464/180 |
| 4,300,803 A | 11/1981 | Chorosevic | |
| 4,379,596 A * | 4/1983 | Green et al. | 301/5.21 |
| 4,728,154 A * | 3/1988 | Boyle et al. | 301/5.21 |
| 5,228,754 A | 7/1993 | Rogers | |
| 5,350,220 A | 9/1994 | Atwell, Jr. | |
| 5,367,909 A * | 11/1994 | Heilman et al. | 73/468 |
| 5,733,016 A | 3/1998 | Brown | |
| 5,778,737 A * | 7/1998 | Welsh et al. | 464/180 |
| 5,959,205 A | 9/1999 | Yamaya et al. | |
| 6,238,005 B1 * | 5/2001 | Sugayauchi et al. | 301/5.21 |
| 6,238,006 B1 | 5/2001 | Manojlovic | |
| 6,250,721 B1 | 6/2001 | Oba et al. | |
| 6,260,929 B1 | 7/2001 | Oba et al. | |
| 6,286,906 B1 | 9/2001 | Nagashima et al. | |
| 6,364,422 B1 | 4/2002 | Sakaki et al. | |
| 6,488,341 B2 | 12/2002 | Maruyama et al. | |
| 6,698,845 B2 | 3/2004 | Corte et al. | |
| 6,811,633 B1 * | 11/2004 | Myers | 156/75 |
| 6,948,781 B2 * | 9/2005 | Sery | 301/5.21 |
| 7,093,907 B2 * | 8/2006 | Jenkins et al. | 301/5.21 |
| 7,216,938 B2 | 5/2007 | Phillips | |
| 7,566,101 B2 | 7/2009 | Jenkins et al. | |
| 7,818,868 B2 | 10/2010 | Chancharoen et al. | |
| 8,066,335 B2 | 11/2011 | Jenkins et al. | |
| 8,414,086 B2 | 4/2013 | Jenkins et al. | |
| 8,628,149 B2 * | 1/2014 | Lussier et al. | 301/5.21 |
| 2003/0067208 A1 | 4/2003 | Maruyama | |
| 2003/0127906 A1 | 7/2003 | Yamaguchi | |
| 2004/0007912 A1 | 1/2004 | Amyot et al. | |
| 2005/0104439 A1 | 5/2005 | Phillips | |
| 2007/0013225 A1 * | 1/2007 | Jenkins et al. | 301/5.21 |
| 2007/0120414 A1 | 5/2007 | Jenkins et al. | |
| 2008/0042486 A1 | 2/2008 | Malbos | |
| 2010/0007194 A1 | 1/2010 | Zank | |
| 2010/0007195 A1 | 1/2010 | Pursley et al. | |
| 2010/0007196 A1 | 1/2010 | Astorino et al. | |
| 2010/0066992 A1 * | 3/2010 | Ono | 355/72 |
| 2010/0117471 A1 * | 5/2010 | Huang | 310/81 |
| 2010/0276001 A1 * | 11/2010 | Sawada et al. | 136/260 |
| 2011/0186131 A1 * | 8/2011 | Mukai et al. | 136/264 |
| 2011/0266862 A1 * | 11/2011 | Halle | F16F 15/345 301/5.21 |
| 2012/0062018 A1 | 3/2012 | Jenkins et al. | |

FOREIGN PATENT DOCUMENTS

| | | |
|---|---|---|
| EP | 1302695 A1 | 4/2003 |
| FR | 2878957 A1 | 6/2006 |
| JP | 4317521 | 7/1948 |
| JP | 5316201 | 2/1978 |
| JP | 3139401 | 6/1991 |
| JP | 3272347 | 12/1991 |
| JP | 3046046 U | 2/1998 |
| JP | 3051017 U | 8/1998 |
| JP | 3053876 U | 11/1998 |
| JP | 3057630 U | 6/1999 |
| JP | 2933098 B2 | 8/1999 |
| JP | 11210835 | 8/1999 |
| JP | 11210836 A | 8/1999 |
| JP | 2000035087 A | 2/2000 |
| JP | 2000046120 A | 2/2000 |
| JP | 3066654 U | 3/2000 |
| JP | 2000145894 A | 5/2000 |
| JP | 2001234980 A | 8/2001 |
| JP | 3333914 B2 | 10/2002 |
| JP | 2003113900 A | 4/2003 |
| JP | 2004092685 A | 3/2004 |
| JP | 3663066 B2 | 6/2005 |
| JP | 3897905 B2 | 3/2007 |

OTHER PUBLICATIONS

Brochure entitled "BADA Wheel Weight Solutions", Jun. 2002.
Web translation of foreign document DE 3118222, 4 pages.

* cited by examiner

VEHICLE WHEEL BALANCE WEIGHTS

PRIORITY CLAIM

This application claims the benefit of U.S. Provisional Application Ser. No. 61/564,640, filed Nov. 29, 2011, which is hereby relied upon and incorporated herein by reference for all purposes.

BACKGROUND OF THE INVENTION

The present invention relates to wheel balance weights.

In order to reduce excessive vibration, vehicle wheels are often balanced by placing weights at selected locations. The weights include a mass portion which is attached to the wheel's rim using a spring clip or a suitable adhesive. Due to high mass and low cost, such weights have been made of lead. Because of various factors, however, it is becoming desirable to manufacture such weights of materials other than lead.

Various configurations of wheel weights made from nonlead material are shown and described in U.S. Pat. No. 8,066,335, incorporated fully herein by reference for all purposes.

SUMMARY OF THE INVENTION

The present invention provides a variety of configurations for a vehicle wheel weight. Preferred embodiments utilize iron or low carbon steel for mass instead of lead as has generally been used in the past. According to one aspect, the present invention provides a vehicle wheel weight for attachment to a wheel rim. The wheel weight comprises a mass portion formed of nonlead material and configured to be juxtaposed against a wheel rim when attached to a wheel. The mass portion defines a clip groove on an exterior side thereof having an upper radial end and a lower radial end, the clip groove being defined in part by opposed first and second sidewalls. The wheel weight further comprises a clip having an extended portion for engaging the wheel rim and an attachment portion seated in the clip groove. The attachment portion of the clip has first and second side edges, at least one of which includes at least one lateral bulge extending outwardly from other portions of the corresponding side edge and engaging a corresponding one of the first and second sidewalls of the clip groove such that the clip is fixed to the mass portion. The attachment portion of the clip defines therein a bulge forming opening, with a portion of the clip defining the opening being deformed to produce the at least one lateral bulge.

A method of manufacturing a vehicle wheel weight is also provided in accordance with this aspect of the present invention. One step of the method involves providing a mass portion formed of nonlead material and configured to be juxtaposed against a wheel rim when attached to a wheel, the mass portion defining a clip groove on an exterior side thereof defined in part by opposed first and second sidewalls. According to another step of the method, a clip is provided having an extended portion for engaging the wheel rim and an attachment portion having substantially straight first and second side edges, the attachment portion further defining at least one bulge forming opening. The attachment portion of the clip is seated in the clip groove of the mass portion. The bulge forming opening is deformed to produce at least one lateral bulge extending outwardly from other portions of the corresponding side edge such that the clip is fixed to the mass portion.

Another aspect of the present invention provides a vehicle wheel weight for attachment to a wheel rim. The wheel weight comprises a mass portion formed of nonlead material and configured to be juxtaposed against a wheel rim when attached to a wheel. The mass portion defines a clip groove on an exterior side thereof, with the clip groove being defined by opposed first and second sidewalls. The wheel weight also includes a clip having an extended portion for engaging the wheel rim and an attachment portion seated in the clip groove. A self-locking arrangement is provided on the clip and the mass portion for interconnecting the attachment portion of the clip with the mass portion such that when the attachment portion is seated in the clip groove the self-locking arrangement secures the clip to the mass portion.

A method of manufacturing a vehicle wheel weight is also provided in accordance with this aspect of the present invention. One step of the method involves providing a mass portion formed of nonlead material and configured to be juxtaposed against a wheel rim when attached to a wheel, the mass portion defining a clip groove on an exterior side thereof with the clip groove being defined by first and second sidewalls. According to another step, a clip is provided having an extended portion for engaging the wheel rim and an attachment portion, the attachment portion defining at least one flexible finger configured to provide a self-locking arrangement. The attachment portion of the clip is seated in the clip groove of the mass portion such that the at least one flexible finger engages an adjacent portion of the mass portion, whereby the clip is fixed to the mass portion.

According to another aspect, the present invention provides a vehicle wheel weight for attachment to a wheel rim. The wheel weight comprises a mass portion formed of nonlead material and configured to be juxtaposed against a wheel rim when attached to a wheel. The mass portion defines a clip groove on an exterior side thereof, the clip groove having an attachment member receiving hole defined therein. The wheel weight also comprises a clip having an extended portion for engaging the wheel rim and an attachment portion seated in the clip groove. The attachment portion of the clip defines at least one securement hole in register with the attachment member receiving hole of the mass portion when the attachment portion of the clip is positioned in the clip groove. An attachment member extends through the securement hole and into the attachment member receiving hole such that the clip is fixed to the mass portion.

A method of manufacturing a vehicle wheel weight is also provided in accordance with this aspect of the present invention. One step of the method involves providing a mass portion formed of nonlead material and configured to be juxtaposed against a wheel rim when attached to a wheel, the mass portion defining a clip groove on an exterior side thereof having an attachment member receiving hole defined therein. A clip is also provided having an extended portion for engaging the wheel rim and an attachment portion, the attachment portion defining at least one securement hole located to register with the attachment member receiving hole. The attachment portion of the clip is seated in the clip groove of the mass portion. An attachment member is inserted through the securement hole and into the attachment member receiving hole, whereby the clip is fixed to the mass portion.

A further aspect of the present invention provides a vehicle wheel weight for attachment to a wheel rim. The wheel weight comprises a mass portion having a radial arc along a length extending from a first end side to a second end side, the mass portion further having an inner axial side for juxtaposition to the wheel rim when attached to a wheel, an outer axial side, an upper radial side and a lower radial side. The mass portion defines a clip groove on one of the inner axial side and the outer axial side, with the clip groove being defined by first and second side walls. The wheel weight further includes a clip having an extended portion for engaging the wheel rim and an attachment portion seated in the clip groove. In addition, the mass portion has an axial arc in a direction of one of the inner axial side and the outer axial side at which the clip groove is located. The mass portion is configurable into a first configuration in which the first and second sidewalls are spaced are apart a distance greater than the width of the clip to enable placement of the clip into the clip groove and a second configuration in which portions of the first and second sidewalls are spaced apart less than the width of the clip to capture and hold the clip in the clip groove, whereby respective first and second sidewalls of the clip groove pinch the attachment portion of the clip to fix the clip to the mass portion.

A method of manufacturing a vehicle wheel weight is also provided in accordance with this aspect of the present invention. One step of the method involves providing a mass portion formed of nonlead material, the mass portion configured having an inner axial side, an outer axial side, an upper radial side and a lower radial side, and defining a clip groove in one of the inner axial side and the outer axial side defined by first and second sidewalls. A clip is provided having an extended portion for engaging the wheel rim and an attachment portion having first and second side edges. The attachment portion of the clip is seated in the clip groove. According to another step, the mass portion is bent toward the one of the inner axial side and the outer axial side in which the clip groove is located such that the first and second sidewalls of the clip groove will pinch the first and second side edges of the attachment portion of the clip, thereby fixing the clip to the mass portion.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
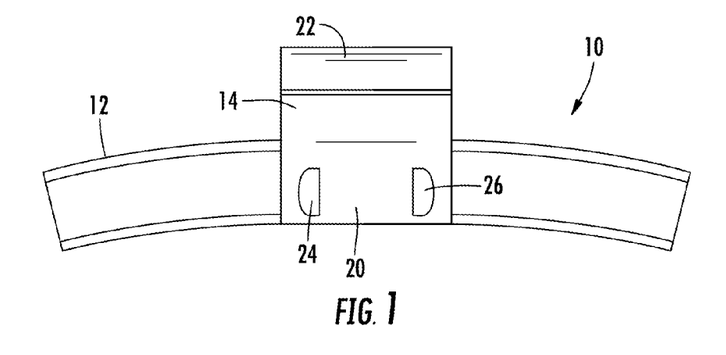
FIG. 1 is a front elevational view of a vehicle wheel weight constructed in accordance with a first embodiment.
Figure 2:
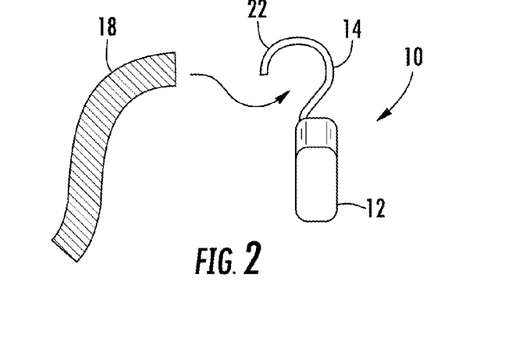
FIG. 2 is a right side elevational view of the wheel weight of FIG. 1.
Figure 3:
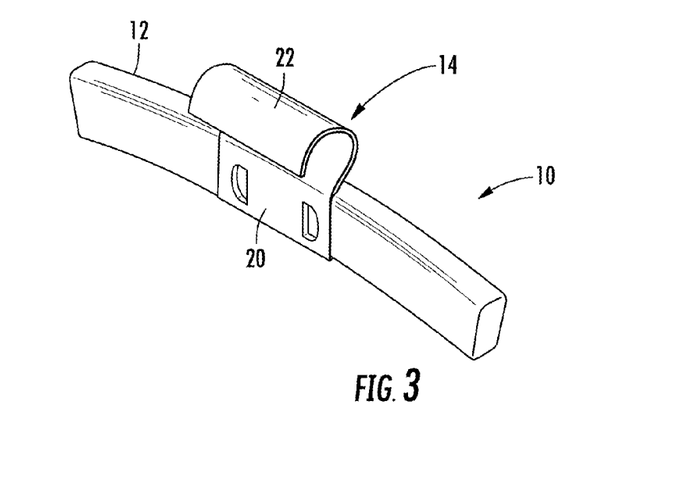
FIG. 3 is a perspective view of the wheel weight of FIG. 1.

FIGS. 1-6 illustrate a vehicle wheel weight 10 constructed in accordance with a first embodiment. Wheel weight 10 includes a mass portion 12 to which a spring clip 14 is attached. As shown, a portion of clip 14 (which may be made from spring steel) is located in a groove 16 (FIG. 4) which has a depth preferably equal to or slightly greater than the thickness of clip 14. As can be seen in FIG. 2, clip 14 serves to attach weight 10 to the rim 18 of a vehicle wheel.

In particular, clip 14 has an attachment portion 20 that is seated in clip groove 16 and an extended portion 22 for engaging wheel rim 18. In this embodiment, groove 16 is defined on the inner (or front) side of mass portion 12 (i.e., the side that is adjacent to wheel rim 18 when the weight is mounted to the wheel). As shown, mass portion 12 has an arcuate shape in the radial direction of the wheel's axis of rotation to approximate the curvature of the rim. Mass portion 12 is preferably made from a nonlead material having suitable mass, such as iron, low carbon steel or an impregnated polymeric. (See U.S. Pat. No. 6,364,422 to Sakaki et al., incorporated herein by reference.) In the illustrated embodiment, mass portion 12 is preferably made entirely of iron or low carbon steel. Often, a 1008 steel will be especially preferred.

Figure 4:
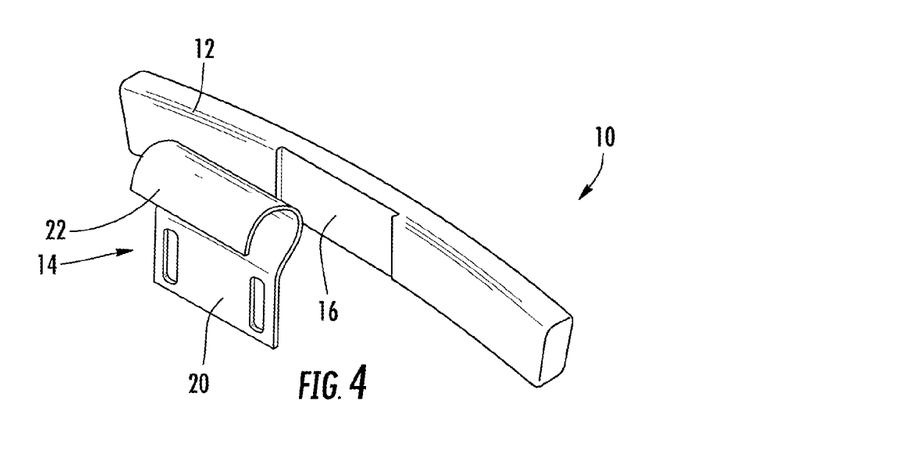
FIG. 4 is a perspective view of the embodiment of FIG. 1 with the clip separated from the mass portion before attachment thereto.
Figure 5:
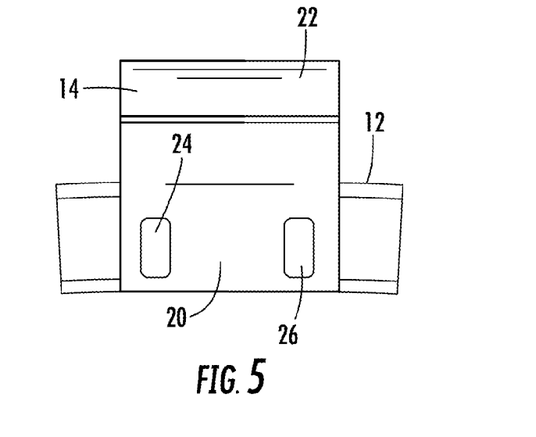
FIG. 5 is an enlarged fragmentary view showing the attachment portion of the clip seated in the clip groove of the mass portion.
Figure 6:
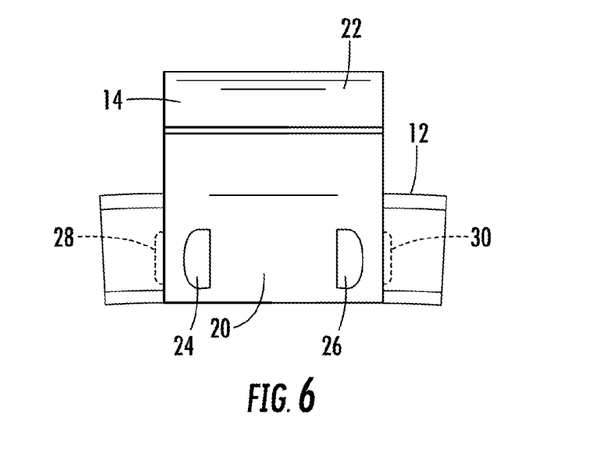
FIG. 6 is a view similar to FIG. 5 but showing the attachment portion of the clip deformed so that the clip is fixed to the mass portion.

Referring now particularly to FIGS. 4-6, one preferred manner for attaching clip 14 to mass portion 12 in accordance with this embodiment will be described. As can be seen, groove 16 is defined having first and second opposed sidewalls. When the attachment portion 20 is seated in groove 16, side edges of attachment portion 20 will be adjacent to a respective sidewall of the groove. In order to secure clip 14 in position, attachment portion 20 defines one or more openings, such as openings 24 and 26, located near the respective side edges. In this example, openings 24 and 26 will initially have a generally rectangular configuration as shown. Attachment portion 20 of clip 14 is then secured to mass portion 12 by deforming openings 24 and 26 in a manner that produces corresponding lateral bulges. In particular, deformation of openings 24 and 26 produces corresponding bulges 28 and 30 which extend outwardly from other portions of the clip side edge and into engagement with the adjacent sidewall of the groove. As a result, clip 14 will be securely fixed to mass portion 12.

In this example, it can be seen that openings 24 and 26 will have a D-shaped configuration after deformation. The deformation may be produced by inserting two prongs of a deforming tool in the respective openings. The prongs of the deforming tool are then moved apart until the appropriate amount of deformation is achieved. Preferably, the material of attachment portion 20 will have a greater hardness than the material of mass portion 12 (at least in the area of groove 16) such that the bulges are more effectively secured in the sidewalls of groove 16.

Referring now to FIGS. 7-11A, a vehicle wheel weight 110 constructed in accordance with a second embodiment is illustrated. As shown, wheel weight 110 includes a mass portion 112 to which a spring clip 114 is attached. As shown, a portion of clip 114 (which may be made from spring steel) is located in a groove 116 (FIG. 10) which has a depth preferably equal to or slightly greater than the thickness of clip 114. Clip 114 serves to attach weight 110 to the rim of a vehicle wheel.

Figure 7:
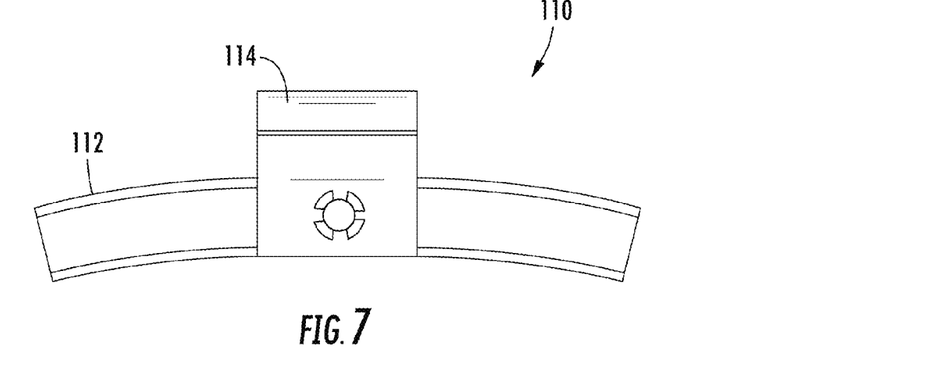
FIG. 7 is a front elevational view of a vehicle wheel weight constructed in accordance with a second embodiment.
Figure 8:
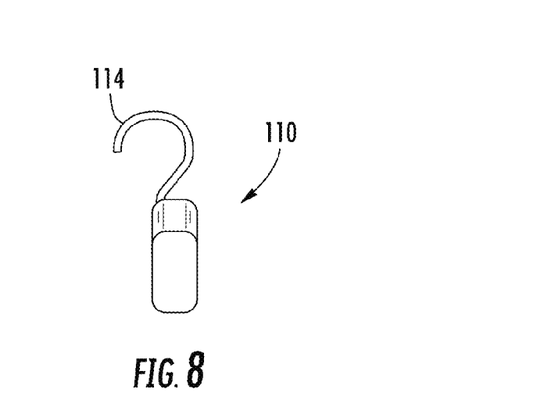
FIG. 8 is a right side elevational view of the wheel weight of FIG. 7.
Figure 9:
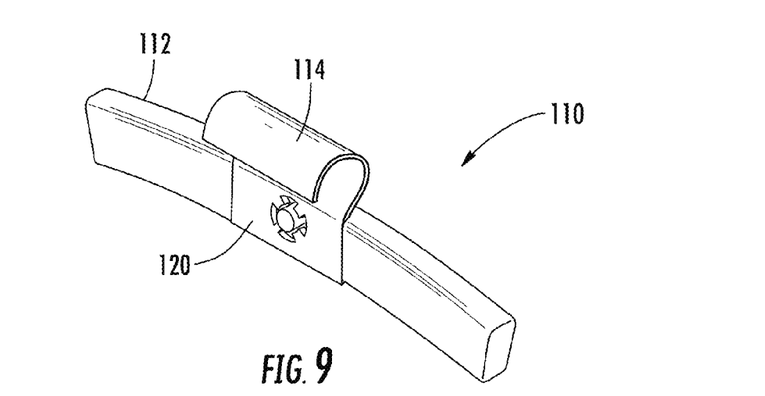
FIG. 9 is a perspective view of the wheel weight of FIG. 7.
Figure 10:
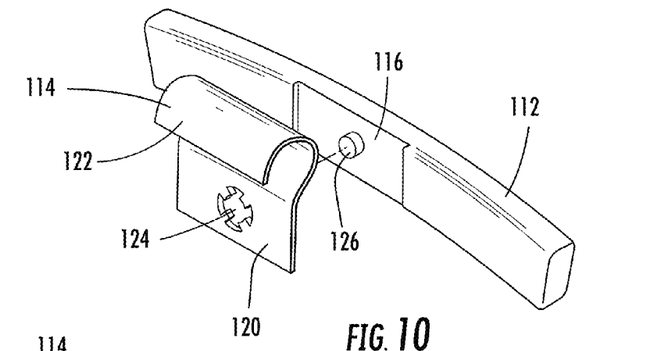
FIG. 10 is a perspective view of the embodiment of FIG. 7 with the clip separated from the mass portion before attachment thereto.

In particular, clip 114 has an attachment portion 120 that is seated in clip groove 116 and an extended portion 122 for engaging the wheel rim. In this embodiment, groove 116 is defined on the inner (or front) side of mass portion 116 (i.e., the side that is adjacent to the wheel rim when the weight is mounted to the wheel). As shown, mass portion 112 has an arcuate shape in the radial direction of the wheel's axis of rotation to approximate the curvature of the rim. Mass portion 112 is preferably made from a nonlead material having suitable mass, such as iron, low carbon steel or an impregnated polymeric.

Figure 11:
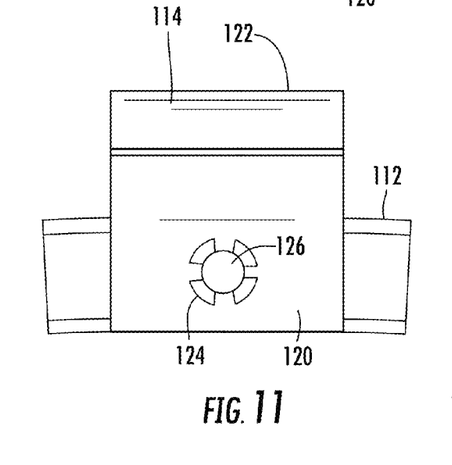
FIG. 11 is an enlarged fragmentary view of the embodiment of FIG. 7 showing the attachment portion of the clip seated in the clip groove of the mass portion and being retained by the self-locking arrangement.
Figure 11A:
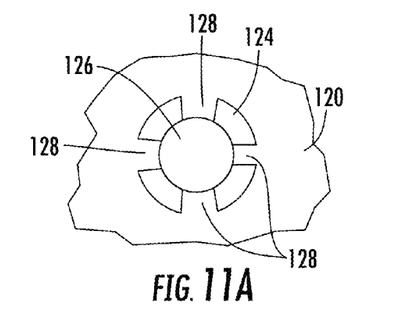
FIG. 11A is an enlarged fragmentary view of the embodiment of FIG. 7 showing the self-locking arrangement in accordance with this embodiment.
Figure 12:
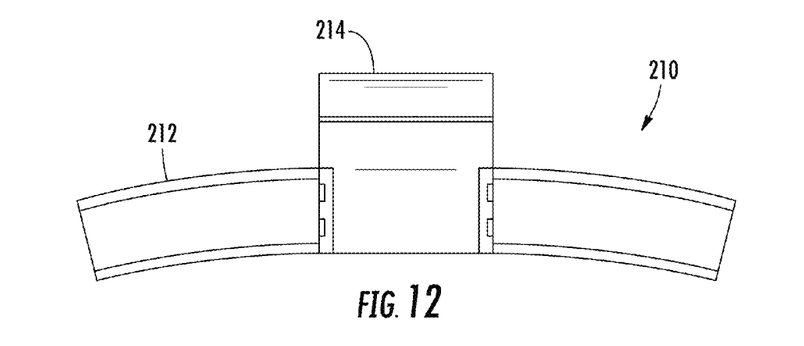
FIG. 12 is a front elevational view of a vehicle wheel weight constructed in accordance with a third embodiment.
Figure 13:
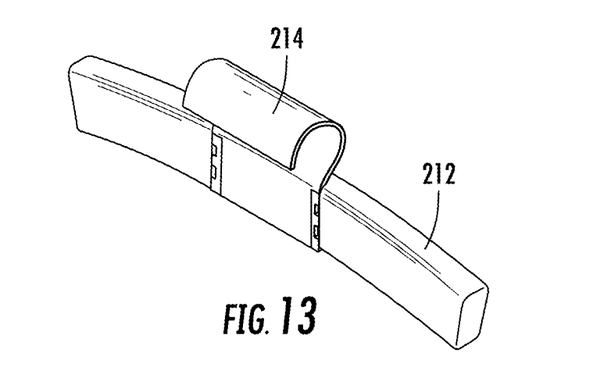
FIG. 13 is a perspective view of the wheel weight of FIG. 12.

Referring particularly to FIGS. 10-11A, one preferred manner for attaching clip 114 to mass portion 112 in accordance with this embodiment will be described. In particular, this embodiment utilizes a self-locking arrangement having interconnecting components on mass portion 112 and clip attachment portion 120 in order to achieve the desired attachment when clip attachment portion 120 is seated in clip groove 116. In this embodiment, the self-locking arrangement includes a securement opening 124 defined in attachment portion 120 of clip 114. When attachment portion 120 is seated in clip groove 116, securement opening 124 receives a post 126 extending perpendicularly from the floor of clip groove 116.

As can be most clearly seen in FIG. 11A, a plurality of flexible fingers 128 are spaced apart about the inner circumference of hole 124. In this embodiment, four such flexible fingers are provided 90 degrees apart from each other. The fingers extend radially inward to engage the columnar outer surface of post 126. The engagement is sufficient to prevent separation of mass portion 112 and clip 114 under expected operating conditions. Preferably, the material of attachment portion 120 will have a greater hardness than the material of mass portion 112 (at least in the area of groove 116) such that the fingers are more effectively secured to post 126.

A third embodiment, similar in many respects to the second embodiment, is illustrated in FIGS. 12-15. In accordance with this embodiment, a wheel weight 210 includes a mass portion 212 to which a spring clip 214 is attached. Like the previous embodiment, mass portion 212 is preferably made from a nonlead material having suitable mass, such as iron, low carbon steel or an impregnated polymeric. Mass portion 212 has an arcuate shape in the radial direction of the wheel's axis of rotation to approximate the curvature of the rim.

As shown, a portion of clip 214 (which may be made from spring steel) is located in a groove 216 (FIG. 14) which has a depth preferably equal to or slightly greater than the thickness of clip 214. Clip 214 serves to attach weight 210 to the rim of a vehicle wheel. In particular, clip 214 has an attachment portion 220 that is seated in clip groove 216 and an extended portion 222 for engaging the wheel rim. In this embodiment, groove 216 is defined on the inner (or front) side of mass portion 212 (i.e., the side that is adjacent to the wheel rim when the weight is mounted to the wheel).

Figure 14:
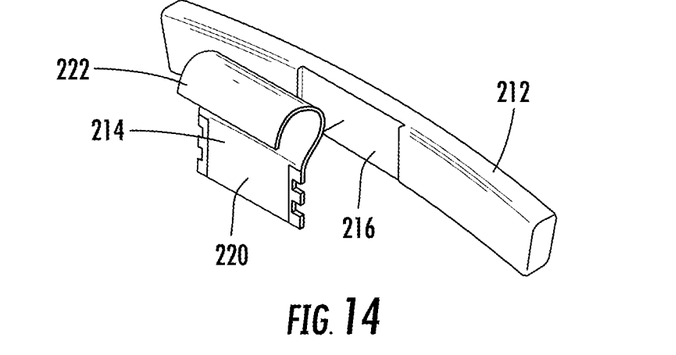
FIG. 14 is a perspective view of the embodiment of FIG. 12 with the clip separated from the mass portion before attachment thereto.
Figure 15:
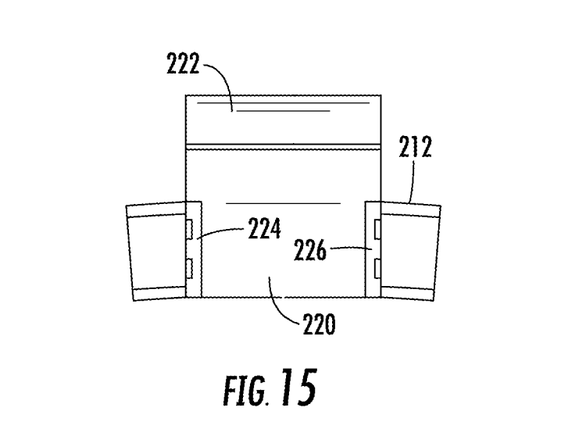
FIG. 15 is an enlarged fragmentary view of the embodiment of FIG. 12 showing the attachment portion of the clip seated in the clip groove of the mass portion and being retained by the self-locking arrangement.

Referring particularly to FIGS. 14-15, one preferred manner for attaching clip 214 to mass portion 212 in accordance with this embodiment will be described. In particular, this embodiment utilizes a self-locking arrangement having interconnecting components on mass portion 212 and attachment portion 220 in order to achieve the desired attachment when attachment portion 220 is seated in clip groove 216. In this embodiment, the self-locking arrangement includes one or more flexible fingers located on at least one side edge of attachment portion 220. For example, a pair of self-locking features 224 and 226 may be located on the lateral sides of attachment portion 220. The width of clip groove 216 is sized such that sidewalls of the clip groove will be engaged by the self-locking features as attachment portion 220 is seated in clip groove 216. Preferably, the material of attachment portion 220 will have a greater hardness than the material of mass portion 212 (at least in the area of groove 216) such that the fingers are more effectively secured to mass portion 212.

Figure 16:
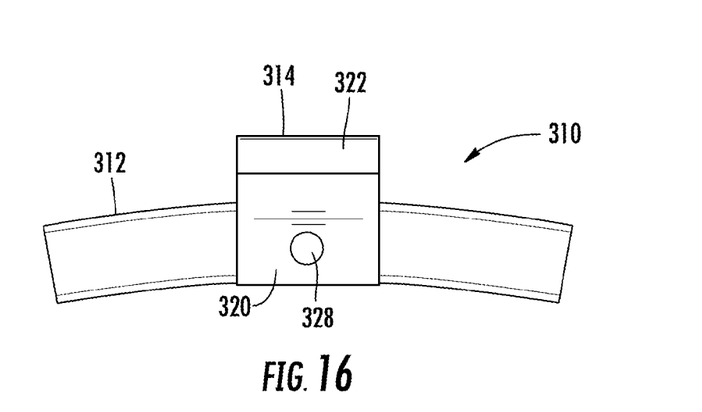
FIG. 16 is a front elevational view of a vehicle wheel weight constructed in accordance with a fourth embodiment.
Figure 17:
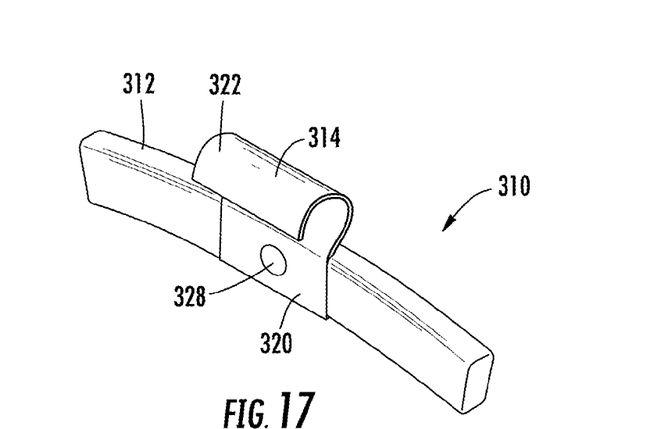
FIG. 17 is a perspective view of the wheel weight of FIG. 16.
Figure 18:
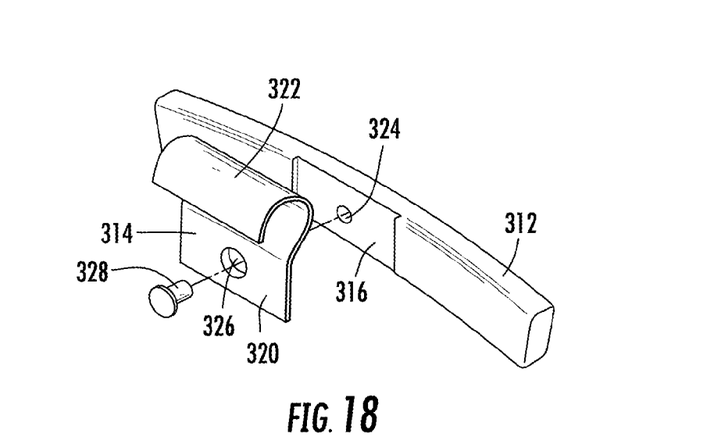
FIG. 18 is a perspective view of the embodiment of FIG. 16 with the clip separated from the mass portion before attachment thereto.
Figure 19:
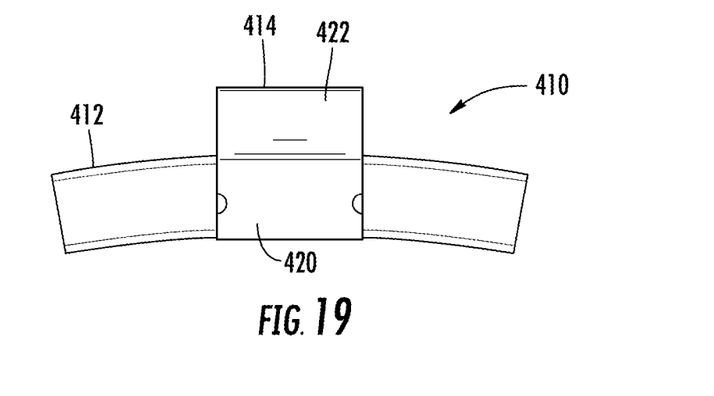
FIG. 19 is a back elevational view of a vehicle wheel weight constructed in accordance with a fifth embodiment.
Figure 20:
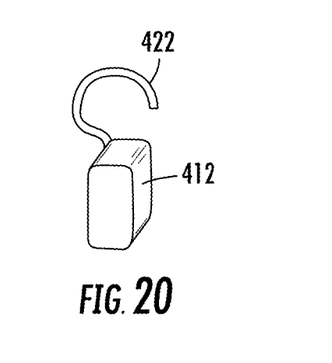
FIG. 20 is a left side elevational view of the wheel weight of FIG. 19.
Figure 21:
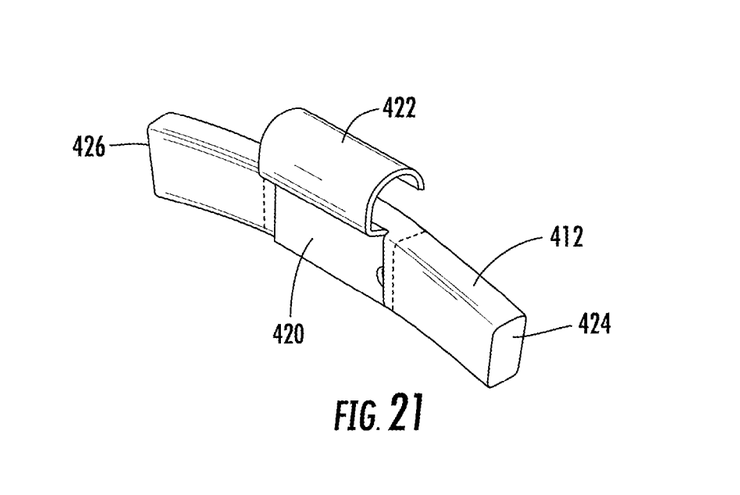
FIG. 21 is a perspective view of the wheel weight of FIG. 19.

FIGS. 16-18 illustrate a vehicle wheel weight 310 constructed in accordance with a fourth embodiment. As shown, wheel weight 310 includes a mass portion 312 to which a spring clip 314 is attached. A portion of clip 314 (which may be made from spring steel) is located in a groove 316 (FIG. 18) which has a depth preferably equal to or slightly greater than the thickness of clip 314. Clip 314 serves to attach weight 310 to the rim of a vehicle wheel.

In particular, clip 314 has an attachment portion 320 that is seated in clip groove 316 and an extended portion 322 for engaging the wheel rim. In this embodiment, groove 316 is defined on the inner (or front) side of mass portion 312 (i.e., the side that is adjacent to the wheel rim when the weight is mounted to the wheel). As shown, mass portion 312 has an arcuate shape in the radial direction of the wheel's axis of rotation to approximate the curvature of the rim. Mass portion 312 is preferably made from a nonlead material having suitable mass, such as iron, low carbon steel or an impregnated polymeric.

Referring now particularly to FIG. 18, one preferred manner for attaching clip 314 to mass portion 312 in accordance with this embodiment will be described. As can be seen, one or more receiving holes, such as receiving hole 324, are defined in mass portion 312. In particular, receiving hole 324 is located in the floor of groove 316 in register with a securement hole 326 defined in clip attachment portion 320. When the clip attachment portion 320 is seated in groove 316, an attachment member 328 is inserted through securement hole 326 and into receiving hole 324. As a result, clip 314 will be secured to mass portion 312.

In this embodiment, attachment member 328 is configured as a pin having a larger diameter head portion and a smaller diameter shank portion. The shank portion is inserted into receiving hole 324 whereas the head portion engages clip 314. It will be appreciated that receiving hole 324 may be formed as a blind bore which extends only partially through mass portion 312. Embodiments are contemplated in which attachment member 328 is retained in receiving hole 324 by press fit. In this regard, the material of attachment member 328 may preferably have a greater hardness than the material of mass portion 312 (at least in the area of groove 316) such that the attachment member is more effectively retained. Embodiments are contemplated in which the attachment member is threaded, in which case receiving hole 324 may be preformed with threads, or not if the attachment member is self-tapping.

A further embodiment will now be described with reference to FIGS. 19-24. As shown, wheel weight 410 includes a mass portion 412 to which a spring clip 414 is attached. Mass portion 412 is preferably made from a nonlead material having suitable mass, such as iron, low carbon steel or an impregnated polymeric. As shown, a portion of clip 414 (which may be made from spring steel) is located in a groove 416 (FIG. 22) which has a depth preferably equal to or slightly greater than the thickness of clip 414. Clip 414 serves to attach weight 410 to the rim of a vehicle wheel.

In particular, clip 414 has an attachment portion 420 that is seated in clip groove 416 and an extended portion 422 for engaging the wheel rim. In this case, groove 416 is illustrated as being defined on the outer (or back) side of mass portion 412 (i.e., the side that is away from the wheel rim when the weight is mounted to the wheel). As shown, mass portion 412 has an arcuate shape in the radial direction of the wheel's axis of rotation to approximate the curvature of the rim. In the illustrated embodiment, mass portion 412 also has an axial arc in the direction toward clip groove 416 (see FIG. 24). As a result, the ends 424 and 426 of mass portion 412 will be located slightly away from the wheel rim whereas the central region of mass portion 412 will rest against the wheel rim. The corners of the mass portion ends being out of contact with the wheel rim may be desirable to prevent scratching of the wheel rim that might otherwise occur.

Figure 22:
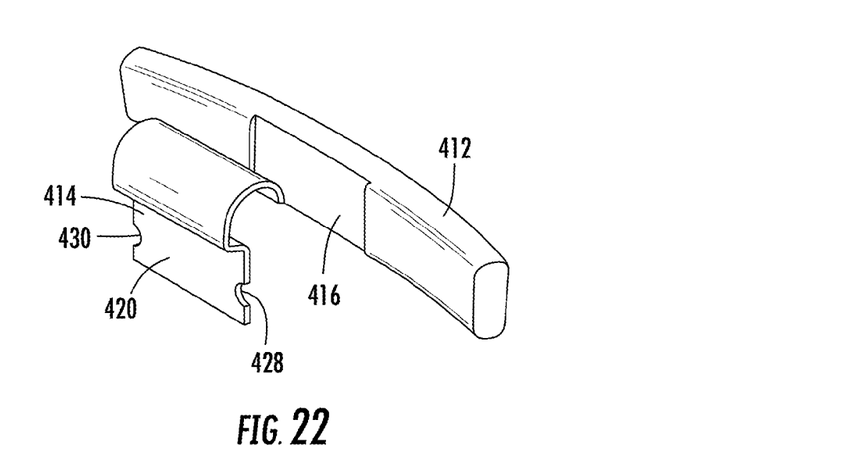
FIG. 22 is a perspective view of the embodiment of FIG. 19 with the clip separated from the mass portion before attachment thereto.
Figure 23:
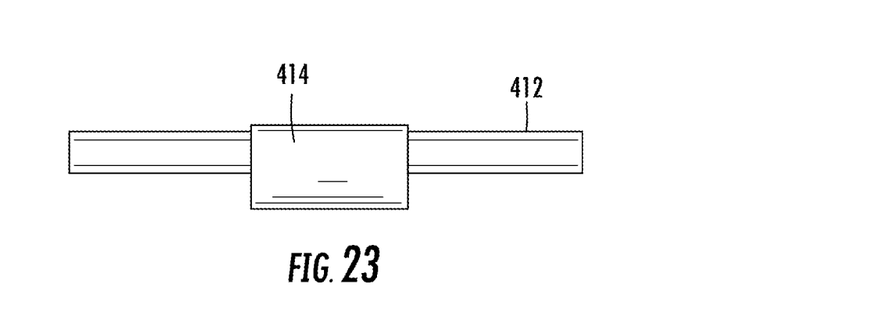
FIG. 23 is a top view of the embodiment of FIG. 19 showing the attachment portion of the clip seated in the clip groove before the clip is fixed thereto.
Figure 24:
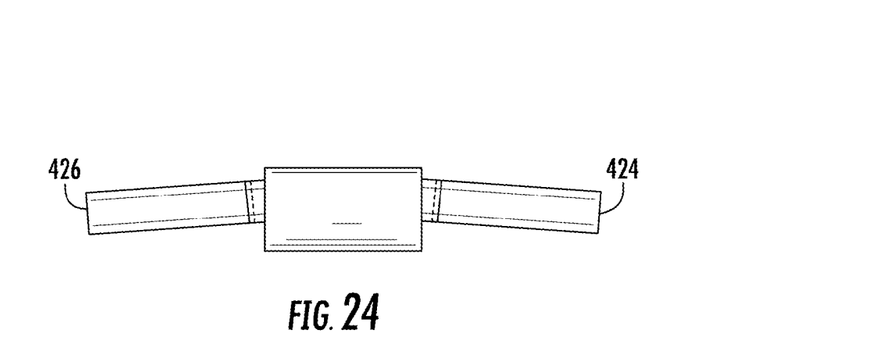
FIG. 24 is a view similar to FIG. 23 but showing how the mass portion has been bent to fix the clip and mass portion together.

In this embodiment, the axial arc described above results from the process of attaching clip 414 to mass portion 412. As shown in FIGS. 22 and 23, mass portion 412 has no axial arc before clip 414 is attached (although it does have a radial arc approximating the curvature of the wheel). Attachment portion 420 of the clip is then seated in clip groove 416 such that side edges of clip attachment portion 420 will be adjacent to the groove sidewalls.

Next, mass portion 412 is bent to provide the axial arc discussed above. The sidewalls of groove 416 will engage the side edges of attachment portion 420 to pinch and thereby retain clip 414. Preferably, clip attachment portion 420 of clip 414 may have lateral interference features, such as indentions 428 and 430 (FIG. 22), to facilitate secure attachment. The material of attachment portion 420 will preferably have a greater hardness than the material of mass portion 412 (at least in the area of groove 416) such that the sidewalls of groove 416 more effectively interact with the lateral interference features.

While the above example results in a mass portion having an axial arc after attachment of the clip, one skilled in the art will appreciate that the reverse could also be done. In other words, mass portion 412 could have an axial arc before clip attachment. The bending used to attach the clip would straighten the mass portion so that it may end up axially straight. In this case, it may be desirable to define the clip groove on the inner (or front) face of the mass portion.

As noted above, the weight mass portions are preferably cold-formed from iron or low carbon steel For example, raw material that is either round in cross-section or preformed with a shape that is either the same as or is substantially similar to the cross-section of the mass portion to be formed (such as round for a wheel balance weight) may be provided. One "piece" of raw material would contain enough material for numerous wheel weight masses. For example, this may be either a long rod or a coil with enough material for hundreds or thousands of finished mass portions.

In this case, the mass forming machinery comprises several subsystems working together. These may be described as follows: 1. Material handling and supply—Either an "uncoiler" or rod feeding equipment is provided to deliver the raw material (e.g., iron). 2. Forming rolls (or other suitable rolling machine) are provided to form the long (wheel size) radius and pre-form the shape that will fit into the rim flange. The amount of pre-forming would be inversely proportional to the size of press being used. 3. A metal forming press may then be used bs used to finish the rim flange shape, form a groove for the wheel balance weight clip, stamp product information into the surface, and cut to the required length. The press working surfaces would be a die that may be progressive or not depending on press size and part details. A large press forming a large part may be able to form all surfaces and cut to length in one stroke. Alternatively, small parts may need to be made in a progressive fashion to get all forming surfaces to bear on a small area. A small press could form a large part by using a progressive die and distributing the work over more than one press cycle. In some cases, it may be desirable in some cases to form the cut-off preform prior to shape finishing, or to form the clip groove by cutting. In fact some of the die operations might be done before the die. The die could then be a stamping/trim die.

Finally, suitable corrosion protection materials may be applied after assembling the mass and clip. Other finishing may or may not be required depending on customer finishing requirements.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A vehicle wheel weight for attachment to a wheel rim, said wheel weight comprising:
  (a) a mass portion formed of nonlead material and configured to be juxtaposed against the wheel rim when attached to a wheel;
  (b) said mass portion defining a clip groove on an exterior side thereof, with the clip groove being defined by opposed first and second sidewalls;

(c) a clip having an extended portion for engaging said wheel rim and an attachment portion seated in said clip groove; and (d) a self-locking arrangement on the clip and the mass portion for interconnecting said attachment portion of said clip with said mass portion such that when said attachment portion is seated in said clip groove said self-locking arrangement secures said clip to said mass portion, wherein said attachment portion of said clip defines at least one securement opening through which a post located in said clip groove of said mass portion is received, said securement opening and said post providing a portion of said self-locking arrangement.

2. The vehicle wheel weight as set forth in claim 1, said securement opening comprises a plurality of radially inward fingers which engage said post.

3. The vehicle wheel weight as set forth in claim 2, wherein said plurality of radially inward fingers comprises four of said radially inward fingers situated 90 degrees apart from each other about a circumference of said securement opening.

4. The vehicle wheel weight as set forth in claim 1, wherein said nonlead material comprises iron.

5. The vehicle wheel weight as set forth in claim 1, wherein said nonlead material comprises low carbon steel.

6. The vehicle wheel weight as set forth in claim 1, wherein said nonlead material comprises 1008 steel.

7. The vehicle wheel weight as set forth in claim 1, wherein a depth of said clip groove is greater than a thickness of said attachment portion of said clip.

8. The vehicle wheel weight as set forth in claim 1, wherein said mass portion is cold formed.

9. The vehicle wheel weight as set forth in claim 8, wherein said mass portion has an arcuate shape.

10. A vehicle wheel weight for attachment to a wheel rim, said wheel weight comprising:
(a) a mass portion formed of nonlead material and configured to be juxtaposed against the wheel rim when attached to a wheel;
(b) said mass portion defining a clip groove on an exterior side thereof, with the clip groove being defined by opposed first and second sidewalls;
(c) a clip having an extended portion for engaging said wheel rim and an attachment portion seated in said clip groove; and
(d) a self-locking arrangement on the clip and the mass portion for interconnecting said attachment portion of said clip with said mass portion such that when said attachment portion is seated in said clip groove said self-locking arrangement secures said clip to said mass portion,
wherein said self-locking arrangement comprises at least one flexible finger on said attachment portion of said clip engaging an adjacent portion of said mass portion.

11. The vehicle wheel weight as set forth in claim 10, wherein said at least one flexible finger is located on a lateral side of said attachment portion of said clip, said flexible finger engaging an adjacent sidewall of said clip groove.

12. The vehicle wheel weight as set forth in claim 11, wherein said attachment portion comprises at least one of said lateral fingers on each lateral side of said attachment portion of said clip engaging respective first and second sidewalls of said clip groove.

13. A method of manufacturing a vehicle wheel weight for engaging a rim of a wheel for use in balancing the wheel, said method comprising:
(a) providing a mass portion formed of nonlead material and configured to be juxtaposed against the wheel rim when attached to a wheel, said mass portion defining a clip groove on an exterior side thereof with the clip groove being defined by first and second sidewalls;
(b) providing a clip having an extended portion for engaging said wheel rim and an attachment portion, said attachment portion defining at least one flexible finger configured to provide a self-locking arrangement; and
(c) seating said attachment portion of said clip in said clip groove of said mass portion such that said at least one flexible finger engages an adjacent portion of said mass portion, whereby said clip is fixed to said mass portion.

14. The method as set forth in claim 13, wherein said mass portion includes a post located in said clip groove and said attachment portion of said clip defines at least one securement opening located to register with said post, said at least one flexible finger being provided at said securement opening.

15. The method as set forth in claim 14, wherein said securement opening comprises a plurality of radially inward fingers which engage said post.

16. The method as set forth in claim 15, wherein said plurality of radially inward fingers comprises four of said radially inward fingers situated 90 degrees apart from each other about a circumference of said securement opening.

17. The method as set forth in claim 13, wherein at least one flexible finger is located on a lateral side of said attachment portion and engages an adjacent sidewall of said clip groove.

18. The method as set forth in claim 17, wherein said attachment portion comprises at least one of said lateral fingers on each lateral side of said attachment portion of said clip engaging respective first and second sidewalls of said clip groove.

19. The method as set forth in claim 13, wherein said nonlead material comprises iron.

20. The method as set forth in claim 13, wherein said nonlead material comprises low carbon steel.

21. The method as set forth in claim 13, wherein said nonlead material comprises 1008 steel.

22. The method as set forth in claim 13, wherein a depth of said clip groove is greater than a thickness of said attachment portion of said clip.

23. The method as set forth in claim 13, wherein said mass portion is cold formed.

24. The method as set forth in claim 13, wherein said mass portion has an arcuate shape.

25. The method as set forth in claim 24, wherein said mass portion includes a first side for juxtaposition against said wheel rim when attached to the wheel and an opposite second side, said clip groove being defined in said first side of said mass portion.

* * * * *